United States Patent
Massari et al.

(10) Patent No.: US 8,378,028 B2
(45) Date of Patent: Feb. 19, 2013

(54) POLYOLEFIN COMPOSITIONS

(75) Inventors: Paola Massari, Ferrara (IT); Marco Ciarafoni, Ferrara (IT); Gisella Biondini, Portomaggiore (IT); Paolo Goberti, Vigarano Mainarda (IT)

(73) Assignee: Basell Poliolefine Italia, S.R.L., Ferrara (IT)

( * ) Notice: Subject to any disclaimer, the term of this patent is extended or adjusted under 35 U.S.C. 154(b) by 258 days.

(21) Appl. No.: 12/735,705

(22) PCT Filed: Feb. 4, 2009

(86) PCT No.: PCT/EP2009/051269
§ 371 (c)(1),
(2), (4) Date: Aug. 10, 2010

(87) PCT Pub. No.: WO2009/106411
PCT Pub. Date: Sep. 3, 2009

(65) Prior Publication Data
US 2010/0308007 A1  Dec. 9, 2010

Related U.S. Application Data

(60) Provisional application No. 61/068,197, filed on Mar. 5, 2008.

(30) Foreign Application Priority Data

Feb. 29, 2008  (EP) ..................... 08152134

(51) Int. Cl.
*B29C 45/00* (2006.01)
*C08F 297/08* (2006.01)
*C08L 23/14* (2006.01)

(52) U.S. Cl. ....................... 525/191; 525/240

(58) Field of Classification Search .................. 525/191, 525/240
See application file for complete search history.

(56) References Cited

U.S. PATENT DOCUMENTS

| | | | |
|---|---|---|---|
| 3,515,775 A | 6/1970 | Combs et al. |
| 4,128,606 A | 12/1978 | Furutachi et al. |
| 4,143,099 A | 3/1979 | Duncan |
| 4,220,579 A | 9/1980 | Rinehart |
| 4,298,718 A | 11/1981 | Mayr et al. |
| 4,313,867 A | 2/1982 | Duvdevani |
| 4,316,966 A | 2/1982 | Mineshima et al. |
| 4,399,054 A | 8/1983 | Ferraris et al. |
| 4,469,648 A | 9/1984 | Ferraris et al. |
| 4,472,524 A | 9/1984 | Albizzati |
| 4,480,065 A | 10/1984 | Kawai et al. |
| 4,495,338 A | 1/1985 | Mayr et al. |
| 4,522,930 A | 6/1985 | Albizzati et al. |
| 4,705,818 A | 11/1987 | Kawai et al. |
| 4,734,459 A | 3/1988 | Cecchin et al. |
| 4,857,613 A | 8/1989 | Zolk et al. |
| 4,871,796 A | 10/1989 | Komatsu et al. |
| 5,055,528 A | 10/1991 | Kioka et al. |
| 5,115,030 A | 5/1992 | Tanaka et al. |
| 5,141,896 A | 8/1992 | Katoh |
| 5,145,819 A | 9/1992 | Winter et al. |
| 5,155,030 A | 10/1992 | Nakamura et al. |
| 5,239,022 A | 8/1993 | Winter et al. |
| 5,243,001 A | 9/1993 | Winter et al. |
| 5,288,824 A | 2/1994 | Kerth et al. |
| 5,324,800 A | 6/1994 | Welborn, Jr. et al. |
| 5,480,972 A | 1/1996 | Avjioglu et al. |
| 5,536,789 A | 7/1996 | Schwager et al. |
| 5,541,260 A | 7/1996 | Pelliconi et al. |
| 5,556,918 A | 9/1996 | Brodt et al. |
| 5,747,592 A | 5/1998 | Huff et al. |
| 5,763,534 A | 6/1998 | Srinivasan et al. |
| 5,824,400 A | 10/1998 | Petrakis et al. |
| 5,840,644 A | 11/1998 | Kuber |
| 6,051,728 A | 4/2000 | Resconi et al. |
| 6,054,406 A | 4/2000 | Smith |
| 6,191,223 B1 | 2/2001 | Dolle et al. |
| 6,214,934 B1 | 4/2001 | Moriya et al. |
| 6,395,832 B1 | 5/2002 | Pelliconi et al. |

(Continued)

FOREIGN PATENT DOCUMENTS

| EP | 0009276 | 4/1980 |
|---|---|---|
| EP | 0045975 | 2/1982 |

(Continued)

OTHER PUBLICATIONS

Wolters, J , "Polyolefin elastomers", Kunststoffe 84 1994 , 446-450.
Randall, J., "A Review of High Resolution Liquid (13) Carbon Nuclear Magnetic Resonance Characterizations of Ethylene-Based Polymers", JMS-Rev. Macromol. Chem. Phys. C29 (2&3) 1989 , 201-317.

(Continued)

*Primary Examiner* — Nathan M Nutter

(57) ABSTRACT

Polyolefin composition, comprising in percent by weight:
1) 75-85% of a copolymer of propylene, said copolymer containing up to 15% by weight, of ethylene and/or $C_4$-$C_{10}$ α-olefin(s) and having a fraction soluble in Xilene at room temperature lower than 6% by weight, and
2) 15-25% of a copolymer of ethylene with one or more $C_4$-$C_{10}$ α-olefin(s) containing from 10 to 25% by weight of said $C_4$-$C_{10}$ α-olefin(s);

said composition having the value of MFR, measured at 230° C., 2.16 kg, of less than 2.5 g/10 min, the total content of ethylene of from 14 to 22% by weight, the total content of $C_4$-$C_{10}$ α-olefin(s) of less than 4.5% by weight, the ratio of the total content of ethylene to the total content of $C_4$-$C_{10}$ α-olefin(s) equal to or higher than 4, the value of the intrinsic viscosity of the total fraction soluble in xylene at room temperature equal to or less than 1.5 dl/g, and the ratio of the amount of component 2) and the amount of $C_4$-$C_{10}$ α-olefin(s) in component 2) equal to or higher than 0.80.

3 Claims, No Drawings

U.S. PATENT DOCUMENTS

| | | |
|---|---|---|
| 6,429,250 B1 | 8/2002 | Rohrmann |
| 6,444,833 B1 | 9/2002 | Ewen et al. |
| 6,451,724 B1 | 9/2002 | Nifant'ev et al. |
| 6,518,386 B1 | 2/2003 | Resconi et al. |
| 6,559,252 B1 | 5/2003 | Horton et al. |
| 6,608,224 B2 | 8/2003 | Resconi et al. |
| 6,635,779 B1 | 10/2003 | Ewen et al. |
| 6,696,520 B1 | 2/2004 | Pellegatti et al. |
| 6,841,501 B2 | 1/2005 | Resconi et al. |
| 6,878,786 B2 | 4/2005 | Resconi et al. |
| 6,953,829 B2 | 10/2005 | Kratzer et al. |
| 7,101,940 B2 | 9/2006 | Schottek et al. |
| 7,112,638 B2 | 9/2006 | Nifant'ev et al. |
| 7,141,527 B1 | 11/2006 | Van Baar et al. |
| 7,141,637 B2 | 11/2006 | Elder et al. |
| 7,238,818 B2 | 7/2007 | Ewen et al. |
| 7,572,859 B2 * | 8/2009 | Pelliconi et al. ............ 525/191 |
| 7,700,690 B2 | 4/2010 | Pelliconi et al. |
| 2003/0008984 A1 | 1/2003 | Kratzer et al. |
| 2003/0013913 A1 | 1/2003 | Schottek et al. |
| 2004/0010087 A1 | 1/2004 | Obata et al. |
| 2006/0041072 A1 | 2/2006 | Pelliconi et al. |
| 2006/0047071 A1 | 3/2006 | Pelliconi et al. |
| 2006/0235139 A1 | 10/2006 | Garagnani et al. |
| 2007/0078224 A1 | 4/2007 | Dominic et al. |

FOREIGN PATENT DOCUMENTS

| | | |
|---|---|---|
| EP | 0045977 | 2/1982 |
| EP | 0086473 | 8/1983 |
| EP | 0129368 | 12/1984 |
| EP | 0170255 | 2/1986 |
| EP | 0323715 | 7/1989 |
| EP | 0353981 | 2/1990 |
| EP | 0361493 | 4/1990 |
| EP | 361493 | 4/1990 |
| EP | 0361494 | 4/1990 |
| EP | 0362705 | 4/1990 |
| EP | 0373660 | 6/1990 |
| EP | 373660 | 6/1990 |
| EP | 0395083 | 10/1990 |
| EP | 0416815 | 3/1991 |
| EP | 0420436 | 4/1991 |
| EP | 0430490 | 6/1991 |
| EP | 0451645 | 10/1991 |
| EP | 0457082 | 11/1991 |
| EP | 472946 | 3/1992 |
| EP | 0485820 | 5/1992 |
| EP | 0485822 | 5/1992 |
| EP | 0519725 | 12/1992 |
| EP | 0553805 | 8/1993 |
| EP | 553806 | 8/1993 |
| EP | 0573862 | 12/1993 |
| EP | 0600246 | 6/1994 |
| EP | 0602512 | 6/1994 |
| EP | 0611801 | 8/1994 |
| EP | 0633289 | 1/1995 |
| EP | 45977 | 3/1995 |
| EP | 0671404 | 9/1995 |
| EP | 0674991 | 10/1995 |
| EP | 0692499 | 1/1996 |
| EP | 0728769 | 8/1996 |
| EP | 0782587 | 7/1997 |
| EP | 0792814 | 9/1997 |
| EP | 0816395 | 1/1998 |
| EP | 0831125 | 3/1998 |
| EP | 0844279 | 5/1998 |
| EP | 0844280 | 5/1998 |
| EP | 0844281 | 5/1998 |
| EP | 728769 | 8/1998 |
| EP | 0936247 | 8/1999 |
| EP | 0936248 | 8/1999 |
| EP | 1236769 | 9/2002 |
| JP | 01016848 | 1/1989 |
| WO | WO-91/02012 | 2/1991 |
| WO | WO-91/04257 | 4/1991 |
| WO | WO-92/00333 | 1/1992 |
| WO | WO-92/22607 | 12/1992 |
| WO | WO-96/22327 | 7/1996 |
| WO | WO-96/22995 | 8/1996 |
| WO | WO-98/22486 | 5/1998 |
| WO | WO-98/37144 | 8/1998 |
| WO | WO-99/21899 | 5/1999 |
| WO | WO-99/24446 | 5/1999 |
| WO | WO-99/58539 | 11/1999 |
| WO | WO-00/26295 | 5/2000 |
| WO | WO 00/63261 | 10/2000 |
| WO | WO-01/19915 | 3/2001 |
| WO | WO-01/21674 | 3/2001 |
| WO | WO-01/44318 | 6/2001 |
| WO | WO-01/47939 | 7/2001 |
| WO | WO 01/57099 | 8/2001 |
| WO | WO-01/62764 | 8/2001 |
| WO | WO-03/045964 | 6/2003 |
| WO | WO-03/051984 | 6/2003 |
| WO | WO-2004/003072 | 1/2004 |
| WO | WO-2005/014715 | 2/2005 |
| WO | WO-2005044911 | 5/2005 |
| WO | WO-2005/121240 | 12/2005 |

OTHER PUBLICATIONS

Kakugo, Masahiro et al., "C NMR Determination of Monomer Sequence Distribution in Ethylene-Propylene copolymers prepared . . . ", Macromolecules, vol. 15, No. 4, 1982, 1150-1152.

Randall, James C., "3.4 Monomer Distributions and Number-Average Sequence Lengths in Ethylene-Propylene Copolymers", Polymer Sequence Determination Cabon-13 NBR Method 1977, 53-58.

* cited by examiner

POLYOLEFIN COMPOSITIONS

This application is the U.S. national phase of International Application PCT/EP2009/051269, filed Feb. 4, 2009, claiming priority to European Application 08152134.6 filed Feb. 29, 2008 and the benefit under 35 U.S.C. 119(e) of U.S. Provisional Application No. 61/068,197, filed Mar. 5, 2008; the disclosures of International Application PCT/EP2009/051269, European Application 08152134.6 and U.S. Provisional Application No. 61/068,197, each as filed, are incorporated herein by reference.

The present invention concerns polyolefin compositions comprising a propylene random copolymer containing ethylene and/or other α-olefins as comonomers, and a copolymer of ethylene with $C_4$-$C_{10}$ α-olefins.

The compositions of the present invention can be easily converted into various kinds of finished or semi-finished articles. In particular, they are suited for the preparation of extrusion blow molded articles.

It is widely known in the art that propylene copolymers can be conveniently used in extrusion processes, and in particular to obtain extrusion blow molded articles, because of their good balance of physical-mechanical properties. Propylene copolymers commonly used in extrusion processes are endowed with acceptable stiffness and impact properties and good optical properties, i.e. low haze values.

It has been known for a long time that the impact resistance of the polypropylene can be improved by adding an adequate quantity of propylene-ethylene elastomeric copolymer by mechanical mixing or sequential polymerization; usually, however, this copolymer loses its transparency.

Low MFR compositions comprising crystalline polypropylene matrix and a rubbery phase formed by an elastomeric copolymer of ethylene with α-olefins are already known in the art, and described in particular in European patent 0373 660. The compositions disclosed have improved impact resistance characteristics at low temperatures and good transparency; the balance of properties is met only if the content of comonomer(s) in the crystalline and rubbery components and the intrinsic viscosity meet certain critical values.

However, it is still felt the need of compositions having low MFR providing improved balance of properties, particularly good transparency and impact properties at low temperatures, for applications such as sheet extrusion/thermoforming, form-fill-seal and blow moulding which are known, particularly when heterophasic compositions are used, to exhibit an undesired lost of transparency after moulding and/or re-heating/annealing of the molded article.

Therefore, there still remains a continuous demand for compositions of this kind with improved properties balanced for specific target applications.

A new and valuable balance of properties has now been achieved by the polyolefin composition of the present invention, comprising in percent by weight (referred to the weight of the composition):

1) 75-85%, preferably 77-83%, of a copolymer of propylene, said copolymer containing up to 15%, preferably from 2.5 to 5%, more preferably from 2.5 to 3.5% by weight of ethylene and/or $C_4$-$C_{10}$ α-olefin(s) and having a fraction soluble in Xilene at room temperature (Xsm) lower than 6%, preferably of from 3 to 5.5%, more preferably from 3.5 to 5.5% by weight (referred to the weight of component 1), and 2) 15-25%, preferably 17-23%, of a copolymer of ethylene with one or more $C_4$-$C_{10}$ α-olefin(s) containing from 10 to 25%, preferably from 12 to 20% by weight (referred to the weight of component 2), of said $C_4$-$C_{10}$ α-olefin(s);

said composition having
- the value of MFR, measured at 230° C., and 2.16 kg, of less than 2.5 g/10 min, preferably from 1.5 to 2 g/10 min,
- the total content of ethylene of from 14 to 22% by weight,
- the total content of $C_4$-$C_{10}$ α-olefin(s) of less than 4.5%, preferably from 2.5 to 4%, more preferably from 3 to 4% by weight,
- the ratio of the total content of ethylene to the total content of $C_4$-$C_{10}$ α-olefin(s) equal to or higher than 4, preferably higher than 5,
- the value of the intrinsic viscosity of the total fraction soluble in xylene at room temperature equal to or less than 1.5 dl/g, preferably of from 1.1 to 1.5 dl/g, and
- the ratio of the amount of component 2) (Split 2) and the amount of $C_4$-$C_{10}$ α-olefin(s) in component 2) (i.e. Split 2/comonomer in component 2)) equal to or higher than 0.80, preferably higher than 0.9, more preferably higher than 1. Other preferred features for the composition of the present invention are:
- the total fraction soluble in xylene of the composition at room temperature (Xstot) of 18% by weight or lower referred to the weight of the composition;
- the fraction soluble in xylene at room temperature of component 2) is at least 40% by weight or more, referred to the weight of component 2);
- the ratio (Xstot/Xsm) of the total fraction soluble in xylene of the composition at room temperature on the fraction soluble in xilene of the component 1) of from 2 to 4, preferably from 2.5 to 3.5;
- the flexural modulus higher than 700 MPa.

The ductile/brittle transition temperature is generally equal to or lower than −20° C., the lower limit being indicatively of about −60° C.

From the above definitions it is evident that the term "copolymer" as used in the present description includes polymers containing more than one kind of comonomers.

The copolymer component 2) as above defined, having a solubility in xylene at room temperature preferably greater than 40% by weight, include from low crystalline to amorphous materials, exhibits typically elastic properties and thus can be indicated as "elastomeric" or "rubbery" component.

The compositions of the present invention provide a valuable combination of properties in particular of impact resistance (in terms of ductile/brittle transition temperature and Izod impact resistance), and top load, impact and transparency measured on bottles according to the methods specified in the description.

The said $C_4$-$C_{10}$ α-olefins, which are or may be present as comonomers in the components and fractions of the compositions of the present invention, are represented by the formula $CH_2=CHR$, wherein R is an alkyl radical, linear or branched, with 2-8 carbon atoms or an aryl (in particular phenyl) radical.

Examples of said $C_4$-$C_{10}$ α-olefins are 1-butene, 1-pentene, 1-hexene, 4-methyl-1-pentene and 1-octene. Particularly preferred is 1-butene.

The compositions of the present invention can be prepared by a sequential polymerization, comprising at least two sequential steps, wherein components 1) and 2) are prepared in separate subsequent steps, operating in each step, except the first step, in the presence of the polymer formed and the catalyst used in the preceding step. The catalyst is added only in the first step, however its activity is such that it is still active for all the subsequent steps.

Preferably component 1) is prepared before component 2).

Therefore, the present invention is further directed to a process for the preparation of the polyolefin compositions as reported above, said process comprising at least two sequential polymerization stages with each subsequent polymerization being conducted in the presence of the polymeric material formed in the immediately preceding polymerization reaction, wherein the polymerization stage of propylene to the co-polymer component 1) is carried out in at least one stage, then at least one copolymerization stage of mixtures of ethylene with one or more $C_4$-$C_{10}$ α-olefin(s) to the elastomeric polymer component 2) is carried out. The polymerisation stages may be carried out in the presence of a stereospecific Ziegler-Natta catalyst.

According to a preferred embodiment, all the polymerisation stages are carried out in the presence of a catalyst comprising a trialkylaluminium compound, optionally an electron donor, and a solid catalyst component comprising a halide or halogen-alcoholate of Ti and an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Preferably the polymerisation catalyst is a Ziegler-Natta catalyst comprising a solid catalyst component comprising:
a) Mg, Ti and halogen and an electron donor (internal donor),
b) an alkylaluminum compound and, optionally (but preferably),
c) one or more electron-donor compounds (external donor).

The internal donor is preferably selected from the esters of mono or dicarboxylic organic acids such as benzoates, malonates, phthalates and certain succinates. They are described in U.S. Pat. No. 4,522,930, European patent 45977 and international patent applications WO 00/63261 and WO 01/57099, for example. Particularly suited are the phthalic acid esters and succinate acids esters. Alkylphthalates are preferred, such as diisobutyl, dioctyl and diphenyl phthalate and benzyl-butyl phthalate.

Among succinates, they are preferably selected from succinates of formula (I) below:

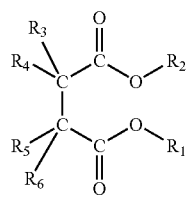

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from primary branched, secondary or tertiary alkyl groups, cycloalkyl, aryl, arylalkyl or alkylaryl groups having from 3 to 20 carbon atoms.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

The external donor (c) can be of the same type or it can be different from the succinates of formula (I). Suitable external electron-donor compounds include silicon compounds, ethers, esters such as phthalates, benzoates, succinates also having a different structure from those of formula (I), amines, heterocyclic compounds and particularly 2,2,6,6-tetramethylpiperidine, ketones and the 1,3-diethers of the general formula (II):

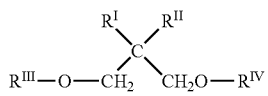

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Preferred electron-donor compounds that can be used as external donors include aromatic silicon compounds containing at least one Si—OR bond, where R is a hydrocarbon radical. A particularly preferred class of external donor compounds is that of silicon compounds of formula $R_a^7 R_b^8 Si(OR^9)_c$, where a and b are integer from 0 to 2, c is an integer from 1 to 3 and the sum (a+b+c) is 4; $R^7$, $R^8$, and $R^9$, are C1-C18 hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyl-dimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, are also preferred the silicon compounds in which a is 0, c is 3, $R^8$ is a branched alkyl or cycloalkyl group, optionally containing heteroatoms, and $R^9$ is methyl. Particularly preferred specific examples of silicon compounds are (tert-butyl)$_2$Si(OCH$_3$)$_2$, (cyclohexyl)(methyl) Si(OCH$_3$)$_2$, (phenyl)$_2$Si(OCH$_3$)$_2$, (cyclopentyl)$_2$Si(OCH$_3$)$_2$, and diiso-propyl dimethoxi silane.

Preferably the electron donor compound (c) is used in such an amount to give a molar ratio between the organoaluminum compound and said electron donor compound (c) of from 0.1 to 500, more preferably from 1 to 300 and in particular from 3 to 30.

As explained above, the solid catalyst component comprises, in addition to the above electron donors, Ti, Mg and halogen. In particular, the catalyst component comprises a titanium compound, having at least a Ti-halogen bond and the above mentioned electron donor compounds supported on a Mg halide. The magnesium halide is preferably $MgCl_2$ in active form, which is widely known from the patent literature as a support for Ziegler-Natta catalysts. U.S. Pat. No. 4,298, 718 and U.S. Pat. No. 4,495,338 were the first to describe the use of these compounds in Ziegler-Natta catalysis. It is known from these patents that the magnesium dihalides in active form used as support or co-support in components of catalysts for the polymerisation of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are $TiCl_4$ and $TiCl_3$; furthermore, also Ti-haloalcoholates of formula $Ti(OR)n-yX_y$ can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula $Ti(OR)n-yX_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compound(s) can be added during the treatment with $TiCl_4$.

Regardless of the preparation method used, the final amount of the electron donor compound(s) is preferably such that the molar ratio with respect to the $MgCl_2$ is from 0.01 to 1, more preferably from 0.05 to 0.5.

The said catalyst components and catalysts are described in WO 00/63261 and WO 01/57099.

The catalysts may be precontacted with small quantities of olefin (prepolymerisation), maintaining the catalyst in suspension in a hydrocarbon solvent, and polymerising at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 µm, a flowability of less than 30 seconds and a bulk density (compacted) greater than 0.4 g/ml.

The polymerisation stages may occur in liquid phase, in gas phase or liquid-gas phase. Preferably, the polymerisation of the co-polymer component 1) is carried out in liquid monomer (e.g. using liquid propylene as diluent), while the copolymerisation stages of the elastomeric copolymer component 2) is carried out in gas phase. Alternatively, all the sequential polymerisation stages can be carried out in gas phase.

The reaction temperature in the polymerisation stage for the preparation of the polymer component 1) and in the preparation of the elastomeric copolymer component 2) may be the same or different, and is preferably from 40 to 100° C.; more preferably, the reaction temperature ranges from 50 to 80° C. in the preparation of polymer component 1), and from 70 to 100° C. for the preparation of polymer component 2).

The pressure of the polymerisation stage to prepare polymer component 1), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerisation pressure preferably ranges from 33 to 43 bar, if done in liquid phase, and from 5 to 30 bar if done in gas phase. The residence times relative to the stages depend on the desired ratio between polymer components 1) and 2), and can usually range from 15 minutes to 8 hours. Conventional molecular weight regulators known in the art, such as chain transfer agents (e.g. hydrogen or $ZnEt_2$), may be used.

The compositions of the present invention can also be obtained by preparing separately the said components 1) and 2), by operating with the same catalysts and substantially under the same polymerization conditions as previously explained (except that a wholly sequential polymerization process will not be carried out, but the said components will be prepared in separate polymerization steps) and then mechanically blending said components in the molten or softened state. Conventional mixing apparatuses, like screw extruders, in particular twin screw extruders, can be used.

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as flexural modulus, Heat Distortion Temperature (HDT), tensile strength at yield and transparency.

Typical examples of nucleating agents are the Na benzoate, talc and the 1,3- and 2,4-dibenzylidenesorbitols.

The nucleating agents are preferably added to the compositions of the present invention in quantities ranging from 0.01 to 2% by weight, more preferably from 0.05 to 1% by weight with respect to the total weight.

The addition of inorganic fillers, such as talc, calcium carbonate and mineral fibers, also brings about an improvement to some mechanical properties, such as flexural modulus and HDT.

The particulars are given in the following examples, which are given to illustrate, without limiting, the present invention.

The data shown in the tables are obtained by using the following test methods.

Molar Ratios of the Feed Gases
Determined by gas-chromatography.
Ethylene and 1-Butene Content of the Polymers
Determined by I.R. spectroscopy
Melt Flow Rate (MFR)
Determined according to ISO 1133 at 230° C. and 2.16 Kg; corresponding to ASTM D 1238, condition L (MFR"L").
Xylene Soluble and Insoluble Fractions
Determined as follows:
2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 10-15 minutes at 100° C. and in thermostatic water bath at 25° C. for 30 minutes as well. The so formed solid is filtered on quick filtering paper. 100 ml of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.
Intrinsic Viscosity (I.V.)
Determined in tetrahydronaphthalene at 135° C.
Flexural Modulus
Determined according to ISO 178 after conditioning for 24 hours.
Izod Impact Strength (Notched)
Determined according to ISO180/1A after conditioning for 24 hours, on T-bar samples prepared according to ISO 1873.
Preparation of the Plaque Specimens
Plaques for D/B Measurement:
Plaques for D/B measurement, having dimensions of 127×127×1.5 mm were prepared with an injection press Negri Bossi™ type (NB 90) with a clamping force of 90 tons. The mould is a rectangular plaque (127×127×1.5 mm).
The main process parameters are reported below:

| | |
|---|---|
| Back pressure (bar): | 20 |
| Injection time (s): | 3 |
| Maximum Injection pressure (MPa): | 14 |
| Hydraulic injection pressure (MPa): | 6-3 |
| First holding hydraulic pressure (MPa): | 4 ± 2 |
| First holding time (s): | 3 |
| Second holding hydraulic pressure (MPa): | 3 ± 2 |
| Second holding time (s): | 7 |
| Cooling time (s): | 20 |
| Mould temperature (° C.): | 60 |

The melt temperature was between 220 and 280° C.
Plaques for Haze Measurement
Plaques for haze measurement, 1 mm thick, were prepared by injection moulding with injection time of 1 second, temperature of 230° C., mould temperature of 40° C. The injection press was a Battenfeld™ type BA 500CD with a clamping force of 50 tons. The insert mould lead to the moulding of two plaques (55×60×1 mm each).
Preparation of the Bottle Specimens
Cylindrical 1 L bottles (35 g) were prepared from the compositions of the examples, with a blow molding machine AUTOMA SPEED 3M—Extrusion continuous Incline Shuttle.

The main process parameters are reported below:

| | |
|---|---|
| screw diameter | 70 mm |
| length/diameter (L/D) ratio | 24 |
| melt temperature | 180° C., |
| mould temperature | 25° C. |

The bottles were tested for impact (at 4° C. and 23° C.), Haze and top load properties according to the procedures described below.
Ductile/Brittle Transition Temperature (D/B)
determined according to the method specified below.
The bi-axial impact resistance was determined through impact with an automatic, computerised striking hammer.
The circular test specimens were obtained from plaques, prepared as described above, by cutting with circular hand punch (38 mm diameter). They were conditioned for at least 12 hours at 23° C. and 50 RH and then placed in a thermostatic bath at testing temperature for 1 hour.
The force-time curve was detected during impact of a striking hammer (5.3 kg, hemispheric punch with a 1.27 cm diameter) on a circular specimen resting on a ring support. The machine used was a CEAST 6758/000 type model No. 2.
D/13 transition temperature means the temperature at which 50% of the samples undergoes fragile break when submitted to the said impact test.
Haze on Plaque
determined according to the method specified below.
The plaques were conditioned for 12 to 48 hours at relative humidity of 50±5% and temperature of 23±1° C.
The instrument used for the test was a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).
The measurement and computation principle are given in the norm ASTM-D 1003.
The haze measurement was carried out on five plaques.
Melting and Crystallization Temperature (Tm and Tc):
Determined by DSC according to ISO 11357/3, with a temperature variation of 20° C. per minute.
Top Load on Bottles
For the test a Instron dynamometer was used, equipped with a balance of 0.2 gr accuracy and with a micrometer of 0.01 mm accuracy. After at least 10-hours conditioning at 23°±1° C. and 50% relative humidity, the bottle is settled between the two plates of the dynamometer and compressed with a stress velocity of the plate of 5 cm/min. The stress at collapse of the bottle is recorded and the value reported in N. The Top Load value is the mean value obtained from measurements repeated on 10 bottles.
Impact on Bottles
Impact was measured on the sample bottles filled with water ⅞ full. After conditioning for 2 hours at the temperature of the test (23° C. and 4° C.) the bottles were left falling from increasing height (up to 280 cm). The parameter reported in table 2 is the height at which 50% of the bottles breaks.
Haze on Bottles
The same method and instrument described for haze measurement on plaque was followed. Samples having average thickness of 0.5 mm were cut from the bottles walls in order to obtain a flat sample that the specimen holder could grasp, according to the above norm ASTM-D1003.

The haze measurement was carried out on five samples.

EXAMPLES 1-5 AND COMPARATIVE 1C

In a plant operating continuously according to the mixed liquid-gas polymerization technique, runs were carried out under the conditions specified in Table 1.

The polymerization was carried out in the presence of a catalyst system in a series of two reactors equipped with devices to transfer the product from one reactor to the one immediately next to it.

Preparation of the Solid Catalyst Component

The Ziegler-Natta catalyst was prepared according to the Example 5, lines 48-55 of the European Patent EP728769. Triethylaluminium (TEAL) was used as co-catalyst and dicyclopentyldimethoxysilane as external donor, with the weight ratios indicated in Table 1.

Catalyst System and Prepolymerization Treatment

The solid catalyst component described above was contacted at 12° C. for 24 minutes with aluminium triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system is then subjected to prepolymerization by maintaining it in suspension in liquid propylene at 20° C. for about 5 minutes before introducing it into the first polymerization reactor.

Polymerization

The polymerisation nm is conducted in continuous in a series of two reactors equipped with devices to transfer the product from one reactor to the one immediately next to it. The first reactor is a liquid phase reactor, and the second reactor is a fluid bed gas phase reactor. Polymer component 1) is prepared in the first reactor, while polymer component 2) is prepared in the second reactor.

Temperature and pressure are maintained constant throughout the course of the reaction. Hydrogen is used as molecular weight regulator.

The gas phase (propylene, ethylene and hydrogen) is continuously analysed via gas-chromatography.

At the end of the run the powder is discharged and dried under a nitrogen flow.

The data relating to Xilene solubles and comonomer content in the final polymer compositions reported in table 1 and 2 are obtained from measurements carried out on the so obtained polymers, stabilized when necessary.

Then the polymer particles are introduced in an extruder, wherein they are mixed with 1500 ppm of a commercial additive marketed by Ciba-Geigy under the name Irganox B 215 (made of 1 part of pentaerytrityl tetrakis 3-(3,5-di-tert-butyl-4-hydroxyphenyl) propanoate and 2 parts of tris(2,4-di-tert-butylphenyl) phosphite), 500 ppm of Ca stearate, and 1800 ppm of 1,3:2,4-bis(3,4-dimethylbenzylidene) sorbitol a clarifying agent marketed by Milliken under the name Millad 3988. The polymer particles are extruded under nitrogen atmosphere in a twin screw extruder, at a rotation speed of 220 rpm and a melt temperature of 200-250° C.

The data relating to the physical-mechanical properties of the final polymer compositions reported in table 2 are obtained from measurements carried out on the so extruded polymers and on bottles obtained according to the procedure described.

REFERENCE EXAMPLE (1R)

The amount of comonomer and properties of a commercially available random copolymer of propylene for injection blow molding application are reported as a reference example.

TABLE 1

| | | Polymerization Process | | | | | |
|---|---|---|---|---|---|---|---|
| | | EXAMPLE | | | | | |
| | | 1C | 1 | 2 | 3 | 4 | 5 |
| TEAL/solid catalyst component | weight ratio | 14 | 16 | 16 | 14 | 17 | 17 |
| TEAL/DCPMS | molar ratio | 3.3 | 3.6 | 3.6 | 3.5 | 6.3 | 6.3 |
| $1^{st}$ liquid phase reactor: propylene-ethylene copolymer - component 1) | | | | | | | |
| Polymerisation temperature | ° C. | 70 | 70 | 70 | 70 | 70 | 70 |
| Pressure | MPa | 39 | 39 | 39 | 39 | 39 | 39 |
| Residence time | min | 78 | 76 | 76 | 74 | 88 | 79 |
| $H_2$ bulk | ppm | 3256 | 3720 | 3720 | 4094 | 3421 | 3642 |
| MFR "L" | g/10 min | 1.9 | 1.5 | 1.3 | 1.8 | 1.3 | 1.3 |
| Ethylene in component 1) | | 2.7 | 2.8 | 2.6 | 2.7 | 3.1 | 3.3 |
| Xylene soluble fraction of component 1) (Xsm) | wt % | 4.1 | | 4.4 | 4.3 | 4.9 | |
| Amount of component 1) (Split 1) | wt % | 84.2 | 80 | 82 | 79 | 78 | 80 |
| $1^{st}$ gas phase reactor: rubbery ethylene-butene-1 copolymer - component 2) | | | | | | | |
| Polymerisation temperature | ° C. | 85 | 85 | 85 | 85 | 85 | 85 |
| Pressure | bar | 19 | 19 | 19 | 19 | 19 | 19 |
| Residence time | min | 21 | 23 | 23 | 24 | 26 | 18 |
| $H_2/C_2^-$ | mol ratio | 0.23 | 0.24 | 0.24 | 0.22 | 0.25 | 0.25 |
| $C_4^-/(C_4^- + C_2^-)$ | mol ratio | 0.40 | 0.40 | 0.40 | 0.33 | 0.31 | 0.29 |
| Amount of component 2) (Split 2) | wt % | 15.8 | 20 | 18 | 21 | 22 | 20 |
| Butene-1 - comonomer in component 2) | wt % | 21 | 20 | 19 | 16 | 15 | 15 |

TABLE 1-continued

|  |  | Polymerization Process EXAMPLE | | | | | |
|---|---|---|---|---|---|---|---|
|  |  | 1C | 1 | 2 | 3 | 4 | 5 |
| Xylene soluble fraction of component 2) | wt % | 56 |  | 57 | 44 | 45 |  |
| Ratio Split 2/comonomer in component (2) |  | 0.76 | 0.99 | 0.94 | 1.26 | 1.38 | 1.36 |

Notes:
$H_2$ bulk = hydrogen concentration in the liquid monomer; $C_2^=$ = ethylene; $C_3^=$ = propilene; $C_4^=$ = butene-1

TABLE 2

|  |  | Example | | | | | | |
|---|---|---|---|---|---|---|---|---|
|  |  | 1R | 1C | 1 | 2 | 3 | 4 | 5 |
| MFR "L" | g/10 min | 1.9 | 2.2 | 1.8 | 1.6 | 1.8 | 1.7 | 1.7 |
| Ethylene content ($C_2$ tot) | wt % | 4.4 | 14.8 | 18.3 | 16.8 | 19.1-19.8 | 20.7 | 20.7 |
| Butene-1 content ($C_4$tot) | wt % | — | 3.3 | 4.1 | 3.5 | 3.4 | 3.4 | 3.4 |
| Ratio $C_2$tot/$C_4$tot) |  |  | 4.5 | 4.5 | 4.8 | 5.7 | 6.1 | 6.1 |
| Xylene-soluble fraction (XStot) | wt % |  | 12.3 | 14.2 | 13.9 | 12.6 | 13.6 | 13.0 |
| I.V. of xylene-soluble fraction | dl/g |  | 1.26 | 1.42 | 1.39 | 1.43 | 1.34 | 1.33 |
| Flexural modulus | MPa | 870 | 895 | 870 | 900 | 807 | 813 | 815 |
| Izod impact resistance at 23° C. | kJ/m$^2$ | 45.3 | 49.5 | 58.7 | 57.8 | 54.9 | 61 | 61.6 |
| Izod impact resistance at 0° C. | kJ/m$^2$ | 6.1 | 27.3 | 44.6 | 36.5 | 36.3 | 48.6 | 44.1 |
| Izod impact resistance at −20° C. | kJ/m$^2$ | — | 3.2 | 3.9 | 3.5 | 3.4 | 3.9 | 3.3 |
| D/B transition temperature | ° C. | 17 | −19 | −22.7 | −29.4 | −24 | −24 | −28 |
| Haze on plaque (1 mm) | % | 13.8 | 14.8 | 14.3 | 14.9 | 14.8 | 13.9 | 12.3 |
| DSC Tm | % | 143.3 | 149.5 | 149.1 | 149.7 | 150.2 | 147.5 | 146.3 |
| DSC Tc | % | 104.9 | 111.8 | 111.7 | 111.4 | 112.3 | 109.8 | 109.1 |
| Top Load | MPa | 275 | 246 | 256 | 253 | 255 | 249 | 240 |
| Impact at 23° C. | cm* | 280 | >280 | >280 | >280 | >280 | >280 | >280 |
| Impact at 4° C. | cm* | 62 | 80-100 | >280 | >280 | >280 | >280 | >280 |
| Haze on bottles | % | 19-28.7 | 24.4 | 25.3 | 25.2 | 26.3 | 23.7 | 24.4 |

*falling height from which 50% of the ⅞ water filled bottles breaks

The invention claimed is:

1. A polyolefin composition, comprising in percent by weight:
   1) 75-85% of a copolymer of propylene, said copolymer containing up to 15% by weight, of ethylene and/or $C_4$-$C_{10}$ α-olefin(s) and having a fraction soluble in xylene at room temperature lower than 6% by weight, and
   2) 15-25% of a copolymer of ethylene with at least one $C_4$-$C_{10}$ α-olefin(s) containing from 10 to 25% by weight of said $C_4$-$C_{10}$ α-olefin(s);
   said composition having
   a value of MFR, measured at 230° C., 2.16 kg, of less than 2.5 g/10 min,
   a total content of ethylene of from 14 to 22% by weight,
   a total content of $C_4$-$C_{10}$ α-olefin(s) of less than 4.5% by weight,
   a ratio of the total content of ethylene to the total content of $C_4$-$C_{10}$ α-olefin(s) of at least 4,
   a value of the intrinsic viscosity of the total fraction soluble in xylene at room temperature of at most 1.5 dl/g, and
   a ratio of the amount of component 2) and the amount of $C_4$-$C_{10}$ α-olefin(s) in component 2) equal to or higher than 0.80.

2. The polyolefin composition of claim 1, further comprising a flexural modulus is of more than 700 MPa.

3. The polyolefin composition of claim 1, further comprising a ductile/brittle transition temperature of at most −20° C.

* * * * *